W. A. Shaw.

Making Lead Pipe.

No. 3,744. Reissued Nov. 23, 1869.

Fig. 2, Mno X Y.

Witnesses
John Martin
Chas Broadway

Inventor
Wm Anthony Shaw

UNITED STATES PATENT OFFICE.

PETER NAYLOR, OF NEW YORK, N. Y., ASSIGNEE OF WILLIAM ANTHONY SHAW.

IMPROVEMENT IN THE MANUFACTURE OF TIN-LINED LEAD PIPE.

Specification forming part of Letters Patent No. 74,613, dated February 18, 1868; antedated February 6, 1868; Reissue No. 3,744, dated November 23, 1869.

*To all whom it may concern:*

Be it known that WILLIAM ANTHONY SHAW, of the city, county, and State of New York, has invented a certain new and useful Improvement in the Manufacture of Tin-Lined Lead Pipe; and I do hereby declare the following to be a full, clear, and exact description of the same, reference being had to the annexed drawings, making part of this specification, in which—

Figure 1:
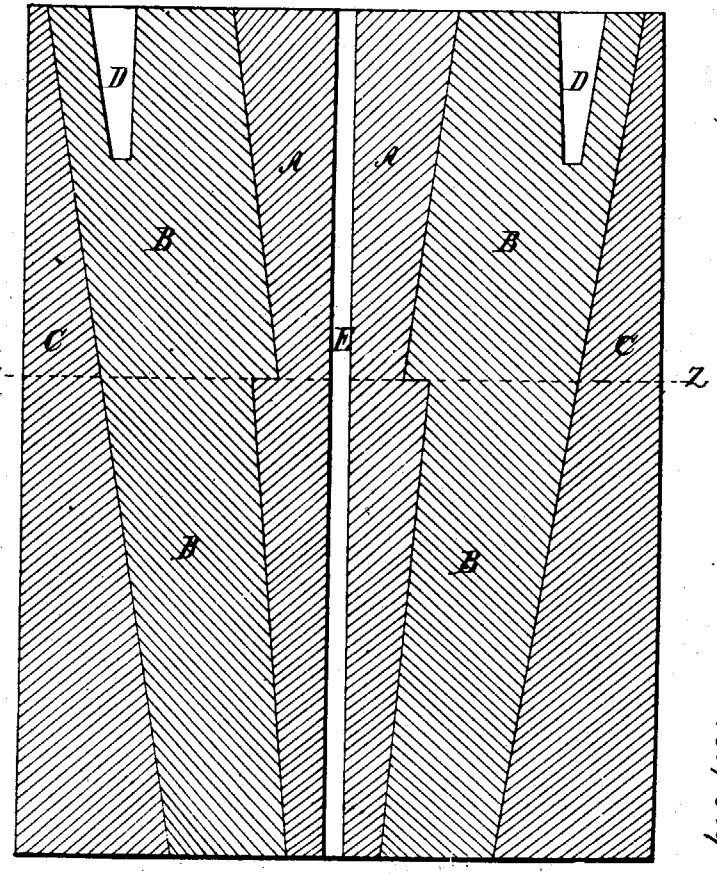
Figure 1:
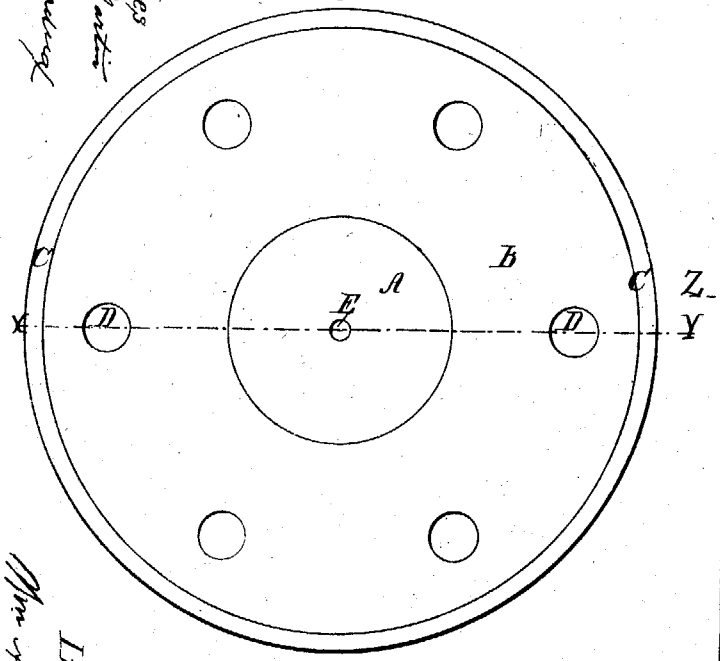

Figure 1 is a top view of the said improvement, and Fig. 2 a vertical section through the same on the line *x y*.

This invention relates to the manufacture of tin-lined lead pipe or lead-incased tin pipe upon the plan stated in the patent granted to said SHAW on the 10th day of March, 1863, which patent was afterward assigned and reissued. In manufacturing this kind of pipe upon the plan stated in said patent or said reissued patent great difficulty is experienced in obtaining a uniform thickness of lining in the pipe. The lining will be thicker in one place than in another, sometimes at one end and sometimes on one side; and then again the lining will be nearly or quite uniform through the entire length of the coil, thus developing a want of certainty in the manufacture of this variety of pipe, which militates very much against the practical value of the invention. The prime cause of this difficulty is undoubtedly owing to the fact that the two metals are both placed in one retaining-cylinder, from whence they have to be forced through one die. The difficulty thus resulting from placing the two metals together in the same cylinder, as indicated in the patent aforesaid, is due to the fact that in pressing an ingot of soft metal out of a retaining-cylinder through a die the metal at the center of the ingot is forced out with greater rapidity than that at the circumference, and especially during the latter part of the stroke. This may be owing to the greater friction of the metal on the sides and bottom of the retaining-cylinder, or it may be owing to the fact that the center of the metal, near the axis of the ingot, is nearest the place of exit through the die, the particles of soft metal passing more freely by each other than by the side of the cylinder, the circumference of the ingot breaking down continually under the end of the ram or applied power, thus forcing the center of the ingot forward. The cause of this phenomenon may be difficult to exactly determine; but of its existence there is no doubt, for by putting the two metals together in the same cylinder and pressing them out, as in the case of the patent above alluded to, the course and disposition of the metal are at once revealed. Now, in the manufacture of lead-incased tin pipe upon the plan of said patent, the tin ingot must be placed around the axis of the mandrel, and consequently is forced out through the die with the greatest rapidity, making the lining in the end of the pipe first formed too thick, and disappearing nearly or wholly in the last end of the coil. This difficulty has been met, and to a certain extent overcome, by a peculiar formation and adjustment of the two ingots in respect to each other and to the die and cylinder. The peculiar formation and adjustment of these ingots in relation to each other, the die, and cylinder, for the purpose of overcoming the difficulty above pointed out, have been heretofore patented by me; but the difficulty, though mitigated, has not entirely disappeared. In making this variety of pipe it has been found that the top of the two ingots or charge moves down without change of form for a certain distance, or until it comes within the influence of the escaping current at the die. The distance that the charge or ingots will thus move down without change of form depends upon the size of the die, and the core and also upon the depth of the cylinder and its diameter.

To overcome the objections above pointed out, the two ingots must be so formed, proportioned, and adjusted in relation to each other, the die, cylinder, and mandrel that the lead ingot, under the operation of the applied power, will not distort the tin ingot to such an extent as to destroy its uniform discharge through the die and the equal thickness of the tin lining or tube in the lead incasement. To meet these conditions the tin ingot is made in the form of a series of superposed frusta of cones, as represented in the drawings, A A, making preferably the upper frustum to contain a little more metal than the lower one, and also a little shorter and more tapering than the latter, placing the lead ingot B around the tin in the manner shown. The number of frusta of cones in the series should be proportionate to the height and diameter of the whole or compound ingot, and it has been found to be best, as a rule to go by, to make the frusta of lengths equal to half the diameter of the ingot. Thus, if the ingot be two half-diameters high, two frusta of cones are to be used, and so on. By these means the tin will be forced out in uniform thickness, or nearly so, from one end of the charge to the other, the shape of the top frustum being gradually transformed to that of the lower one as the charge works off. These frusta may be made separately—that is, parted on the transverse dotted line *z* in Fig. 2, or in casting they may be parted longitudinally through the center—or they may be cast in one piece of ingot, as experience may seem to dictate. The same object—that is to say, a uniform thickness of lead and tin through the whole length of pipe—may be approximately obtained even when a cylindrical central ingot is used, or one that is nearly cylindrical, by coring out the lead ingot to reduce the quantity of metal and the consequent excessive density thereof toward the last part of the charge, by which the proper relative proportion of the tin and lead in the pipe is destroyed, the lead being in excess and the tin too thin; but by making the cavities D in the top of the ingot the metal has an opportunity to spread and relieve the tendency to force out the center or middle of the ingot; but to get the best result from the preparation of the charge, and to prevent the lead from alloying excessively with the tin, and to save the waste of time incidental to the chilling of the central or tin ingot as now practiced, two molds are first made of the form of a frustum of a cone, as represented by the two parts of the lead ingots B and C when separated on the line *z*. Two cores are then made of the forms, respectively, of the top and bottom parts of the tin ingot A. One of the last mentioned cores is then put in each of the aforementioned molds, and the two parts of the lead ingot, which is divided on the line *z*, are then cast separately in their respective molds. These two parts of the lead ingot are then put together in a metal receiver made for that purpose. The mandrel E is then set in the center of the lead ingot B thus formed, and the tin ingot is cast around the mandrel, and the lead ingot C is afterward cast, either in the cylinder of the press or in a separate mold, around the ingot B. By this means the excessive alloying and waste of time above alluded to are completely avoided, and at the same time the lower part of the charge is obtained hottest, for by making the intermediate ingot like an inverted frustum of a cone and casting the melted lead around it the greatest mass of hot lead will be in the bottom of the cylinder, and the ingot heated at the desired point previous to the application of the power thereto. The intermediate ingot may be of lead or some suitable alloy, as lead and zinc, or lead and copper, or lead and antimony, or it may be of any alloy which will melt at a somewhat higher temperature than tin, thus improving the pipe by strengthening it and affording better facility for making the joints with solder, removing, as it does, all danger of melting the lining in the pipe, as sometimes happens in the case of pure tin.

The proportion and form of the central and intermediate ingots may be modified without departure from the spirit of this invention.

The general form herein shown will be well to preserve, without meaning, however, to confine this invention to the exact form or to any given taper or proportion of the respective ingots, or to the above-described order of making them. The idea which this invention is intended to reduce to practice is to so form and proportion the two ingots or metals in respect to each other, the cylinder, die, and mandrel that, notwithstanding the change which takes place in their relative shapes or forms under the operation of the applied power, they will nevertheless dispose themselves in their proper relative position and proportion when forced out of the die, in the form of pipe, and also to prevent the lead from alloying excessively with the tin.

While, therefore, it is not intended to limit this patent to the number of pieces of which the ingot is made, or yet to the form or outline of the frustum or frusta of cones, whether in the one or the other ingot,

What is claimed as the invention of the said WILLIAM ANTHONY SHAW is—

1. The manufacture of lead-incased tin pipe from ingots or a charge of metal, made, substantially as herein described, in three parts, whether the same be united before or after they are put into the cylinder.

2. The manufacture of lead-incased tin pipe from a compound ingot composed of concentric parts of lead and tin, when the central ingot is made of tin in the form of superposed inverted frusta of cones or their equivalent.

3. In the manufacture of the compound ingot for lead-incased tin pipe, the employment of an intermediate cone or cones, whereby a large portion of the lead ingot may be cast without contact with the tin, thus reducing the alloying of the two metals.

4. In the manufacture of the compound ingot, as herein described, the formation of the tin ingot of superposed inverted frusta of cones, the upper one being of larger diameter but proportionally shorter than the lower.

In testimony whereof I have hereunto set my hand in the presence of two subscribing witnesses.

PETER NAYLOR.

Witnesses:
B. HAXTUN,
JARED COFFIN.